United States Patent [19]

Hagiwara et al.

[11] 4,289,687
[45] Sep. 15, 1981

[54] FIRE RETARDANT RESIN MOLDED PRODUCT AND PREPARATION PROCESS OF THE SAME

[75] Inventors: Miyuki Hagiwara, Maebashi; Yosuke Morita, Takasaki, both of Japan

[73] Assignee: Japan Atomic Energy Research Institute, Tokyo, Japan

[21] Appl. No.: 114,420

[22] Filed: Jan. 22, 1980

[30] Foreign Application Priority Data

Jan. 22, 1979 [JP] Japan ............................. 54/004802
Jul. 19, 1979 [JP] Japan ............................. 54/092019

[51] Int. Cl.$^3$ ..................... C08F 255/02; C08K 5/03
[52] U.S. Cl. .................... 260/45.85 E; 174/110 SR; 174/110 P; 260/42.39; 260/42.42; 260/45.7 R; 260/45.75 B; 260/45.85 V; 260/45.95 G; 428/379; 525/289
[58] Field of Search ................ 260/45.7 RL, 42.39, 260/42.42, 45.85 E, 45.85 V, 45.95 G; 428/379; 525/289

[56] References Cited

U.S. PATENT DOCUMENTS

| | | |
|---|---|---|
| 3,741,929 | 6/1973 | Burton .............................. 260/42.39 |
| 3,847,864 | 11/1974 | Chase et al. ................. 260/45.7 RL |
| 3,908,067 | 9/1975 | Mackenzie, Jr. et al. ... 260/45.85 E |
| 3,927,145 | 12/1975 | Gaeckel et al. ............. 260/45.7 RL |
| 3,929,939 | 12/1975 | Salyer et al. ..................... 260/42.39 |
| 4,041,016 | 8/1977 | Fenoglio ..................... 260/45.7 RL |
| 4,127,559 | 11/1978 | Newcombe ................. 260/45.7 RL |

OTHER PUBLICATIONS

Dictionary of Organic Compounds, vol. 1, 1965, p. 6.

*Primary Examiner*—Howard E. Schain
*Assistant Examiner*—R. A. White
*Attorney, Agent, or Firm*—Oblon, Fisher, Spivak, McClelland & Maier

[57] ABSTRACT

A fire-retardant and radiation resistant molded resin product is prepared by blending a resin with a halogenated acenaphthylene compound of the formula:

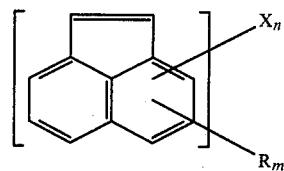

wherein X is chlorine or bromine and R is alkyl, alkoxy or alkylester of 1 to 4 carbon atoms such that when m is 0, n is an integer of 2 to 8; when m is an integer of 1 to 4, n is an integer of 2 to 7 and $n+m$ is $\leq 8$ and when m is more than 2, R may be the same or different; and, after molding said blend, generating free radicals within said blend.

10 Claims, No Drawings

FIRE RETARDANT RESIN MOLDED PRODUCT AND PREPARATION PROCESS OF THE SAME

BACKGROUND OF THE INVENTION

The present invention relates to a fire retardant resin molded product, and to a process for preparing the same.

From a viewpoint of safety in an atomic power station, a demand for improvement of the reliability on and the health of electric cable for light-water type power reactor is now going on increasing. Saturated hydrocarbon polymers such as polyethylene and ethylene-propylene copolymer have been used as an insulating material for electric cable. These materials are widely used because of being relatively excellent in radiation resistance in addition of insulation ability, workability and economy. However, their mortal defect lies in combustibility.

Today a combustible resin such as polyethylene, polypropylene and ethylene-propylene rubber is mixed with various fire retardant additives for the purpose of making the resin fire retardant. As a fire retardant additive, a halogenated aliphatic compound such as chlorinated paraffine and chlorinated polyethylene and a halogenated aromatic compound such as hexabromo benzene and decabromo diphenylether are known. However, the halogenated aromatic compound, from the molecular structural point of view, is wanting in compatibility with resins and often blooms to the surface of resin during use for a long term and volatilizes at elevated temperatures and thereby has a tendency to bring on a change in fire retardance of resin.

Further, recently, in an electric wire, cable and various machinery and tools used for a nuclear reactor, breeder reactor and ionizing radiation generator, from the viewpoint of safety, it has become indispensable to be fire retardant. Therefore, various resin compositions used as insulating materials for electric wires and cables, packings and sealing materials, are required to be not only fire retardant but also radiation resistant.

SUMMARY OF THE INVENTION

Accordingly, an object of the present invention is to provide a fire retardant resin molded product capable of maintaining a fire retardance stable over a long period and a property as not volatilizing nor blooming when used at elevated temperatures for a long time.

Further, an object of the present invention is to provide a resin molded product having a remarkably improved fire retardance and simultaneously having a radiation resistance. The present inventors have found that a specific acenaphthylene compound melts and disperses relatively uniformly into a resinous material when milling to the resinous material or molding under heat and polymerizes by subjecting to a treatment with free radical generation and partially grafting to the resinous materials and thereby provide a high fire retardance thereto and thereby the resulting molded product is prevented from volatilization and leaching on use, and have accomplished the present invention.

That is, the fire retardant resin molded product of the present invention is obtained by blending a resin with a halogenated acenaphthylene represented by the formula

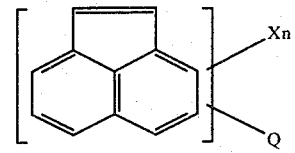

, wherein X is chlorine or bromine atom; Q is O or Rm wherein R is an alkyl, alkoxy or alkylester group having 1 to 4 carbon atoms; when Q is O, n is an integer of 2 to 8 and when Q is Rm, n is an integer of 2 to 7, m is an integer of 1 to 4; and $n+m \leq 8$, in case m is more than 2 R may be the same or different, and, after molding, subjecting the resin to a treatment with free radical generation. X in the formula of fire retardant additive is chlorine or bromine which may coexist in the same molecule. In case of $n=1$ the fire retardant effect is scarcely recognized. The substitution of above $n=2$ is required for fire retardant effect. A resin composition with a fire retardant additive high in polymerizability displays very high fire retardant properties because such fire retardant additive is distributed homogeneously and fixed completely in the resin. The compatibility of fire retardant additive and resin is improved by introducing an alkyl group, a methoxy group, or a methylester group thereinto. Thereby the workability in milling and molding and such a property as not volatilizing nor blooming on use at elevated temperatures for a long period are increased. An acenaphthylene derivative having more than four alkyl groups is difficult to synthesize and also the derivative having a longer alkyl chain than limited length should not be used because it lowers the fire retardant properties and the radiation resistance.

DETAILED DESCRIPTION OF THE PREFERRED EMBODIMENTS

The concrete example corresponding to Rm in the formula of fire retardant additive includes 3-methyl, 5-methyl, 3-ethyl, 4-ethyl, 3,5-dimethyl, 3,5-diethyl, 5,6-dimethyl, 5-butyl, 3-methoxy, 5-methoxy, 5-ethoxy, 3,5-dimethoxy, 5,6-dimethoxy, 5-butoxy, 3,5-dimethylester, 5-methylester, etc.

The resinous material to be improved its fire retardant properties according the present invention includes, for example, polyethylene, polypropylene, polybutene, ethylene-vinyl acetate copolymer, ethylene-ethylacrylate copolymer, ethylene-propylene copolymer, ethylene-propylene-diene copolymer, ethylene-vinylchloride copolymer, ethylene-vinylacetate-graft vinylchloride copolymer, ethylene-propylene-graft vinylchloride copolymer, chlorinated polyethylene, chlorinated polyethylene-graft vinyl chloride copolymer, polyurethane, polyamide, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, polyester-ether elastomer, etc. The fire retardant resin molded product of the present invention can be prepared by subjecting the fire retardant resin composition to a treatment with free radical generation. In order to increase the yield of polymer of acenaphthylene derivative in the resin by the treatment with free radical generation, it is effective to mix an appropriate amount of acenaphthylene and other radical polymerizable compounds or radical polymerizable fire retardant additives into the acenaphthylene derivative and to make them copolymerize or cograft.

The amount of fire retardant additive to be mixed is preferably determined within the range of about 5 to 150 parts, by weight, per 100 parts, by weight, of resin for good fire retardant properties in lower limit and sufficient extensibility and flexibility of resin in upper limit. With regard to the radiation resistance, an effect is recognized in the resin composition added with more than 0.5 parts, by weight, of acenaphthylene derivative and the more the amount is the greater the effect is.

As a concrete means for treatment with free radical generation, so called "heating method" as blending an organic peroxide such as dicumyl peroxide, 1,3-bis (t-butyl peroxide), 1,3-bis(t-butyl peroxy isopropyl)benzene, 2,5-dimethyl-2,5-di(t-butyl peroxy)hexyne-3, di-t-butyl peroxide, etc. into the resin composition and heating and the irradiation of ionizing radiation such as β ray, γ ray and accelerated electron beams are included. From the viewpoint of operation effect it is preferable for some kinds of resin to mix a polyfunctional monomer such as trimethylolpropane trimethacrylate, polyethylene glycol dimethacrylate, triarylisocyanurate, etc. in the treatment with free radical generation. And also it is preferable for fire retardant properties to add an inorganic filler such as antimony trioxide, aluminium hydroxide, talc, etc. Further, there is no harm in adding a reinforcing agent, a filler, a pigment, a lubricant and a heat or light stabilizer, etc.

The present invention will be explained more in detail in the following Examples.

EXAMPLES 1 TO 5 AND COMPARATIVE EXAMPLES 1 TO 3

All components were milled uniformly on a hot roll and thereafter were heated and pressed by a hot press at 180° C. for 20 minutes to mold a sheet of 1 to 3 mm in thickness.

The loading unit of each component is shown by part by weight.

| | |
|---|---|
| Example 1 | |
| Polyethylene | 100 |
| Chlorinated polyethylene (Chlorine content 40%) | 35 |
| 3,5-dibromoacenaphthylene | 30 |
| 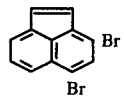 | |
| Antimony trioxide | 10 |
| 2,6-di-t-butylphenol | 0.5 |
| Dicumylperoxide | 3 |
| Example 2 | |
| Polyethylene | 100 |
| Chlorinated polyethylene (Chlorine content 40%) | 35 |
| 3,5,6,8-tetrabromoacenaphthylene | 30 |
| 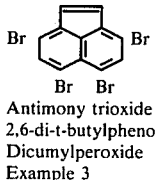 | |
| Antimony trioxide | 20 |
| 2,6-di-t-butylphenol | 0.5 |
| Dicumylperoxide | 3 |
| Example 3 | |
| Ethylene-vinylacetate copolymer (Combined vinylacetate 30%, by weight) | 100 |
| 3,5,6,8-tetrachloracenaphthylene | 35 |
| 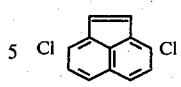 | |
| Antimony trioxide | 15 |
| 2,6-di-t-butylphenol | 0.5 |
| Dicumylperoxide | 2 |
| Example 4 | |
| Polyethylene | 100 |
| Chlorinated polyethylene (Chlorine content 40%) | 35 |
| 1,3,5,6,8-pentachloracenaphthylene | 30 |
| 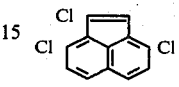 | |
| Antimony trioxide | 20 |
| 2,6-di-t-butylphenol | 0.5 |
| Dicumylperoxide | 3 |
| Example 5 | |
| Ethylene-propylene copolymer (Combined propylene 40% by weight) | 100 |
| 1,3,5,6,8-pentabromacenaphthylene | 30 |
| 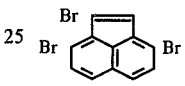 | |
| Antimony trioxide | 20 |
| 2,6-di-t-butylphenol | 0.5 |
| Dicumylperoxide | 3 |
| Talc | 100 |
| Comparative Example 1 | |
| Polyethylene | 100 |
| Chlorinated polyethylene (Chlorine content 40%) | 35 |
| Hexabromobenzene | 30 |
| 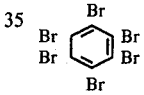 | |
| Antimony trioxide | 20 |
| 2,6-di-t-butylphenol | 0.5 |
| Dicumylperoxide | 3 |
| Comparative Example 2 | |
| Polyethylene | 100 |
| Chlorinated polyethylene (Chlorine content 40%) | 0.5 |
| 2,4,3',5'-tetrabromosalicylanilide | 2 |
| 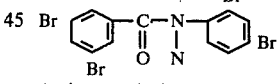 | |
| Antimony trioxide | 20 |
| 2,6-di-t-butylphenol | 0.5 |
| Dicumylperoxide | 3 |
| Comparative Example 3 | |
| Ethylene-propylene copolymer | 100 |
| 3,5,3',5'-tetrabromodiphenyl | 30 |
| 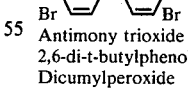 | |
| Antimony trioxide | 20 |
| 2,6-di-t-butylphenol | 0.5 |
| Dicumylperoxide | 3 |
| Talc | 100 |

The sheets obtained from the above examples were testing on blooming and burning. In the blooming test a sheet was let alone stand in a thermostatic chamber at 121° C. for 168 hours and then, after allowing to cool to room temperatures, the sheet was observed on whether there is a bloom. The burning test was based upon ASTM D635-74. The burning times before and after the blooming test were measured. The test results are as shown in Table 1.

TABLE 1

| | Example | | | | | Comparative Example | | |
|---|---|---|---|---|---|---|---|---|
| | 1 | 2 | 3 | 4 | 5 | 1 | 2 | 3 |
| Blooming | none | none | none | none | none | found | found | found |
| Burning time Before heat. (Second) | 5 | 5 | 5 | 5 | 5 | 5 | 5 | 5 |
| After heat. | 5 | 5 | 5 | 5 | 5 | >20 | >15 | >10 |
| Oxygen index before heating test (%) | 25 | 27 | 25 | 26 | 31 | 25 | 25 | 26 |

EXAMPLES 6 TO 10 AND COMPARATIVE EXAMPLES 4 TO 7

All components other than a free radical generating agent were milled uniformly on a hot roll and thereafter added with a free radical generating agent, and then the resulting composition was heated under pressure by a hot press at 160° C. for 30 minutes to mold a sheet of 1 to 3 mm in thickness.

The loading unit of each component is shown by part by weight.

| | |
|---|---|
| Example 6 | |
| Polyethylene (ZF-30, made by Mitsubishi Petrochem. Co.) | 100 |
| Chlorinated polyethylene (Chlorine content 40%) | 35 |
| 3-methyl, 1,5,6,8-tetrabromacenaphthylene | 30 |

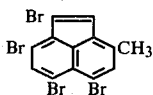

| | |
|---|---|
| Antimony trioxide | 20 |
| 2,6-di-t-butylphenol | 0.5 |
| Dicumylperoxide | 3 |
| Example 7 | |
| Polyethylene (ZF-30 made by the same company) | 100 |
| Chlorinated polyethylene (Chlorine content 40%) | 35 |
| 5-butoxy, 1,3,6,8-tetrabromacenaphthylene | 50 |

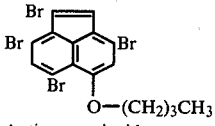

| | |
|---|---|
| Antimony trioxide | 25 |
| 2,6-di-t-butylphenol | 0.5 |
| Dicumylperoxide | 5 |
| Example 8 | |
| Ethylene-vinylacetate copolymer (Yukalon Eva 25 K, made by the same company) | 100 |
| 3-methyl, 1,5,6,8-tetrachloracenaphthylene | 35 |

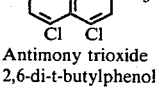

| | |
|---|---|
| Antimony trioxide | 15 |
| 2,6-di-t-butylphenol | 0.5 |
| Dicumylperoxide | 3 |
| Example 9 | |
| Ethylene-propylene-diene copolymer (EP-21 made by Japan Synthetic Rubber Co.) | 100 |
| 3,5-dimethyl, 1,6,8-tribromacenaphthylene | 30 |

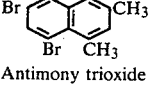

| | |
|---|---|
| Antimony trioxide | 20 |
| 2,6-di-t-butylphenol | 0.5 |
| Dicumylperoxide | 3 |
| Talc | 100 |
| Example 10 | |
| Ethylene-propylene-diene copolymer (EP-21 made by Japan Synthetic Rubber Co.) | 100 |
| 5-butoxy, 1,3,6,8-tetrachloracenaphthylene | 40 |

$$\text{Cl-acenaphthylene structure with } C=O \text{ and } O-(CH_2)_3CH_3$$

| | |
|---|---|
| Antimony trioxide | 25 |
| 2,6-di-t-butylphenol | 0.5 |
| Dicumylperoxide | 4 |
| Talc | 100 |
| Comparative Example 4 | |
| Polyethylene (ZF-30) | 100 |
| Chlorinated polyethylene (Chlorine content 40%) | 0.5 |
| 2,4,3',5'-tetrabromsalicylanilide | 2 |

$$\text{Br-phenyl-C(=O)-N(H)-phenyl-Br structure}$$

| | |
|---|---|
| Antimony trioxide | 20 |
| 2,6-di-t-butylphenol | 0.5 |
| Dicumylperoxide | 3 |
| Comparative Example 5 | |
| Ethylene-propylene copolymer (EP-21) | 100 |
| 3,5,3',5'-tetrabromdiphenyl | 30 |

$$\text{Br-phenyl-phenyl-Br structure}$$

| | |
|---|---|
| Antimony trioxide | 10 |
| 2,6-di-t-butylphenol | 0.5 |
| Dicumylperoxide | 3 |
| Comparative Example 7 | |
| Polyethylene (ZF-30) | 100 |
| Chlorinated polyethylene (Chlorine content 40%) | 35 |
| 1,3,5,6,8-pentabromacenaphthylene | 30 |

$$\text{Br-acenaphthylene with Br, Br, Br substituents}$$

| | |
|---|---|
| Antimony trioxide | 20 |
| 2,6-di-t-butylphenol | 0.5 |
| Dicumylperoxide | 3 |
| Comparative Example 8 | |
| Ethylene-vinylacetate copolymer (Yukalon Eva 25 K) | 100 |
| 1,3,5,6,8-pentachloracenaphthylene | 35 |

$$\text{Cl-acenaphthylene with Cl, Cl, Cl substituents}$$

| | |
|---|---|
| Antimony trioxide | 15 |
| 2,6-di-t-butylphenol | 0.5 |
| Dicumylperoxide | 2 |

The sheets obtained from the above examples were tested in the same manner as in Examples 1 to 5. The test results are as shown in Table 2. Incidentally, the residual rate of fire retardant additive is meant by a percentage of fire retardant additive polymer obtained by Soxhlet extracting a small piece 1 mm square of molded sheet in toluene for the amount of fire retardant additive added. (Lower polymer components in the extraction liquid were recovered by reprecipitation with methanol and added to the residual rate.)

oxide, respectively, as a fire retardant addition was made. The test results for these samples are as shown in Table 4.

TABLE 4

|  | Example of the present invention | Comparative Examples | |
|---|---|---|---|
| Fire retardant additive | Br—[acenaphthylene]—Br, Br | Br—[biphenyl with Br substituents]—Br | Br—[diphenyl ether with Br substituents]—Br |
| Blooming | none | found | none |
| Oxygen index | 30 | 26 | 27 |
| Physical properties* | Tensile strength 0.68Kg/mm² Elongation 120% Bending test good | — | Tensile strength 0.55Kg/mm² Elongation 45% Bending test Broken |

*Physical properties after the samples were treated by thermal aging (121°C, 168 hours), radiation irradiation (200 Mrad in open air) and exposure to superheated steam (150°C, 72 hours).

TABLE 2

|  |  | Example | | | | | Comparative Example | | | | |
|---|---|---|---|---|---|---|---|---|---|---|---|
|  |  | 6 | 7 | 8 | 9 | 10 | 4 | 5 | 6 | 7 | 8 |
| Blooming |  | none | none | none | none | none | found | found | none | none | none |
| Burning time | Before heating | 4 | 2 | 5 | 4 | 4 | 5 | 5 | 5 | 5 | 5 |
| (second) | After heating | 4 | 2 | 5 | 4 | 4 | >15 | >10 | 5 | 5 | 5 |
| Oxygen index before heating test (%) |  | 30 | 35 | 27 | 29 | 28 | 25 | 26 | 25 | 28 | 25 |
| Polymerization rate of fire retardant additive (%) |  | 72 | 81 | 74 | 71 | 83 | 0 | 0 | 61 | 48 | 53 |

EXAMPLES 11 AND 12

Fire retardant polyethylene sheet of 2 mm in thickness having the composition of Example 6 and fire retardant ethylene-propylene-diene copolymer sheet of 2 mm in thickness having the composition of Example 9 were irradiated with 100 Mrad of γ ray at room temperatures in air and were measured their mechanical properties before and after irradiation to evaluate the resistance to radiation. The results are as shown in Table 3.

TABLE 3

|  |  | Example | | Comparative Example | |
|---|---|---|---|---|---|
|  |  | 11 | 12 | 4 | 5 |
| Tensile strength (kg/cm²) | Before irradiation | 1.98 | 0.85 | 1.70 | 0.50 |
|  | After irradiation | 2.10 | 0.90 | 1.65 | 0.45 |
| Elongation (%) | Before irradiation | 570 | 680 | 580 | 720 |
|  | After irradiation | 310 | 370 | 190 | 170 |

As is evident from the table, according to the present invention, a fire retardant resin composition which is high in residue of elongation and excellent in resistance to radiation can be obtained.

EXAMPLE 13

100 parts of ethylene-propylene copolymer (EP-21), 30 parts of 1,3,5-tribromacenaphthylene as a fire retardant additive, 5 parts of ZnO, 0.4 part of S, 6 parts of Sb₂O₃, 1.5 parts of antioxidant, 1 part of lubricant and 100 parts of talc in weight were milled, and further 3 parts of dicumylperoxide as a free radical generating agent were added thereto and the fire retardant additive was polymerized at a condition of 160° C. and 100 kg/cm² and simultaneously molded to the desired shape. For comparison, each sample having used 3,5,3′,5′-tetrabromodiphenyl and decabromodiphenyl As shown in the above description, the present invention can provide an excellent fire retardant resin molded product in which a fire retardant additive does not bloom nor volatilize by blending a specific fire retardant addition, and has no harmful effect on the aging behaviour.

What is claimed is:

1. A process for preparing a fire-retardant and radiation resistant molded resin product, which comprises:
blending a resin selected from the group consisting of polyethylene, polypropylene, polybutene, ethylene-vinyl acetate copolymer, ethylene-ethylacrylate copolymer, ethylene-propylene copolymer, ethylene-propylene-diene copolymer, ethylene-vinylchloride copolymer, ethylene-vinylacetate-graft vinylchloride copolymer, ethylene-propylene-graft vinylchloride copolymer, chlorinated polyethylene, chlorinated polyethylene-graft vinylchloride copolymer, polyurethane, polyamide, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, and polyester-ether elastomer with a halogenated acenaphthylene compound of the formula:

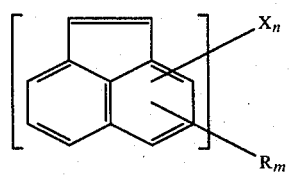

wherein X is chlorine or bromine and R is alkyl, alkoxy or an alkylester of 1 to 4 carbon atoms such that when m is 0, n is an integer of 2 to 8; when m is an integer of 1 to 4, n is an integer of 2 to 7 and $n+m \leq 8$, and when m is more than 2, R may be the same or different; and, after molding said blend, generating free radicals in said blend.

2. The process of claim 1, wherein the value of m in said halogenated acenaphthylene is 0.

3. The process of claim 1, wherein the value of m in said halogenated acenaphthylene is an integer of 1 to 4.

4. The process of claim 1, which further comprises:
blending an organic peroxide with said resin and halogenated acenaphthylene prior to said molding step, and then heating said molded blend to generate free radicals therein.

5. The process of claim 1, wherein said free radicals are generated in said blend by subjecting said molded blend to radiation.

6. The process of claim 1, wherein said halogenated acenaphthylene compound is blended with said resin in an amount of 5 to 150 parts by wt. per 100 parts by wt. of said resin component.

7. The process of claim 4, wherein said organic peroxide is dicumyl peroxide, 1,3-bis(t-butyl peroxide), 1,3-bis(t-butylperoxyisopropyl)benzene, 2,5-dimethyl-2,5-di(t-butylperoxy)hexyne-3, or di-t-butyl peroxide.

8. A fire retardant and radiation resistant molded resin product prepared by a process, comprising:
blending a resin selected from the group consisting of polyethylene, polypropylene, polybutene, ethylene-vinylacetate copolymer, ethylene-ethylacrylate copolymer, ethylene-propylene copolymer, ethylene-propylene-diene copolymer, ethylene-vinylchloride copolymer, ethylene-vinylacetate-graft vinylchloride copolymer, ethylene-propylene-graft vinylchloride copolymer, chlorinated polyethylene, chlorinated polyethylene-graft vinylchloride copolymer, polyurethane, polyamide, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, and polyester-ether elastomer with a halogenated acenaphthylene compound of the formula:

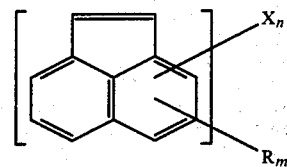

wherein X is chlorine or bromine and R is alkyl, alkoxy or alkyl ester of 1 to 4 carbon atoms such that when m is an integer of 1 to 4, n is an integer of 2 to 7 and $n+m$ is $\leq 8$ and when m is more than 2, R may be the same or different; and, after molding said blend, generating free radicals in said blend.

9. The molded product of claim 8, wherein said alkyl substituent is methyl, ethyl or butyl, said alkoxy substituent is methoxy, ethoxy or butoxy and said alkyl ester substituent is methyl ester.

10. The molded product of claim 8, which further comprises:
blending an organic peroxide with said resin and halogenated acenaphthylene prior to said molding step, and then heating said molded blend to generate free radicals therein.

* * * * *